(12) United States Patent
Meltser et al.

(10) Patent No.: US 8,724,758 B2
(45) Date of Patent: May 13, 2014

(54) POWER-EFFICIENT VARIABLE-CLOCK-RATE DIGRF INTERFACE

(75) Inventors: Ilan Meltser, Petach-Tikva (IL); Avner Epstein, Givatayim (IL); Yehoshua Yabbo, Karkur (IL)

(73) Assignee: Marvell World Trade Ltd., St. Michael (BB)

( * ) Notice: Subject to any disclaimer, the term of this patent is extended or adjusted under 35 U.S.C. 154(b) by 147 days.

(21) Appl. No.: 13/342,992

(22) Filed: Jan. 4, 2012

(65) Prior Publication Data

US 2012/0177163 A1 Jul. 12, 2012

Related U.S. Application Data

(60) Provisional application No. 61/430,437, filed on Jan. 6, 2011.

(51) Int. Cl.
*H04L 7/00* (2006.01)

(52) U.S. Cl.
USPC ........... 375/354; 375/376; 375/373; 375/371; 375/355

(58) Field of Classification Search
USPC .......................... 375/376, 354, 373, 371, 355
See application file for complete search history.

(56) References Cited

U.S. PATENT DOCUMENTS

| | | | |
|---|---|---|---|
| 6,198,755 B1 | 3/2001 | Berry | |
| 6,741,615 B1 | 5/2004 | Patwardhan et al. | |
| 6,876,630 B1 | 4/2005 | Shim | |
| 7,600,162 B2 | 10/2009 | Nishizawa | |
| 8,059,684 B2 | 11/2011 | Xiao et al. | |
| 8,331,885 B1* | 12/2012 | Ben-Ari | 455/127.5 |
| 8,406,702 B2* | 3/2013 | Crowley et al. | 455/76 |
| 8,437,725 B2* | 5/2013 | Brunel et al. | 455/296 |
| 8,473,000 B2* | 6/2013 | Kelleher et al. | 455/552.1 |
| 2003/0079118 A1 | 4/2003 | Chow | |
| 2007/0033493 A1 | 2/2007 | Flake | |
| 2007/0217378 A1 | 9/2007 | Moorti et al. | |
| 2007/0232244 A1 | 10/2007 | Mo et al. | |
| 2007/0254599 A1* | 11/2007 | O'Keeffe et al. | 455/75 |
| 2007/0273709 A1 | 11/2007 | Kimura et al. | |
| 2008/0267332 A1* | 10/2008 | Garg et al. | 375/371 |
| 2009/0022177 A1* | 1/2009 | Schuster et al. | 370/468 |
| 2009/0086870 A1 | 4/2009 | Mohiuddin | |
| 2009/0238103 A1* | 9/2009 | Yamazaki | 370/310 |
| 2009/0245334 A1 | 10/2009 | Chaudhuri et al. | |
| 2009/0252075 A1 | 10/2009 | Ji et al. | |
| 2010/0118999 A1 | 5/2010 | Inagawa | |
| 2010/0265953 A1 | 10/2010 | Xiao et al. | |
| 2011/0012663 A1* | 1/2011 | Crowley et al. | 327/299 |
| 2011/0075762 A1 | 3/2011 | Jeon | |
| 2011/0167185 A1* | 7/2011 | O'Brien et al. | 710/107 |
| 2012/0033720 A1* | 2/2012 | Brunel et al. | 375/225 |

OTHER PUBLICATIONS

MIPI Alliance, Inc., "Draft MIPI Alliance Specification for DigRF v4," draft version 1.00.00, revision 0.03, Dec. 15, 2009.

(Continued)

*Primary Examiner* — Kenneth Lam

(57) ABSTRACT

A method in a communication device includes exchanging data between a Baseband Integrated Circuit (BBIC) and a Radio Frequency Integrated Circuit (RFIC) over a digital interface having a variable clock rate. The clock rate of the digital interface is modified repeatedly during a communication session conducted by the communication device, in response to changes in a current operational state of the communication device during the communication session, to a lowest clock rate that is suitable for the current operational state, so as to reduce a power consumption of the communication device.

20 Claims, 3 Drawing Sheets

(56) References Cited

OTHER PUBLICATIONS

MIPI Alliance, Inc., "Draft MIPI Alliance Specification for Dual Mode 2.5G/3G Baseband/RFIC Interface," draft version 3.09.05, Revision 0.02—Dec. 7, 2009.

MIPI Alliance, Inc., "Draft MIPI Alliance Specification for DigRF v4," draft version 1.00.00, revision 0.01, Nov. 20, 2009.
MIPI Alliance, Inc., "Draft MIPI Alliance Specification for MPHY," draft version 0.80.00, revision 0.04, Apr. 12, 2010.
U.S. Appl. No. 13/371,438, filed Feb 12, 2012.
U.S. Appl. No. 13/371,438 office action dated Aug. 15, 2013.

* cited by examiner

POWER-EFFICIENT VARIABLE-CLOCK-RATE DIGRF INTERFACE

CROSS-REFERENCE TO RELATED APPLICATIONS

This application claims the benefit of U.S. Provisional Patent Application 61/430,437, filed Jan. 6, 2011, whose disclosure is incorporated herein by reference.

FIELD OF THE DISCLOSURE

The present invention relates generally to communication devices, and particularly to power-efficient interfacing between baseband devices and Radio Frequency (RF) circuitry.

BACKGROUND

Some communication devices, such as wireless communication terminals and base stations, comprise a Baseband Integrated Circuit (BBIC) and a Radio Frequency Integrated Circuit (RFIC) that are connected by a digital interface. For example, the Mobile Industry Processor Interface (MIPI) Alliance has developed a set of such interface specifications called DigRF.

DigRF interfaces are specified, for example, in "MIPI Alliance Specification for DigRF v4," draft version 1.00.00, revision 0.03, Dec. 15, 2009, which is incorporated herein by reference. Another DigRF variant, sometimes referred to as "DigRF-3G," is specified in "MIPI Alliance Specification for Dual Mode 2.5 G/3 G Baseband/RFIC Interface," draft version 3.09.04, Apr. 1, 2008, which is incorporated herein by reference. In the context of the present patent application and in the claims, the term "DigRF specification" refers collectively to any and all DigRF specifications and their variants and extensions, unless specifically noted otherwise.

The description above is presented as a general overview of related art in this field and should not be construed as an admission that any of the information it contains constitutes prior art against the present patent application.

SUMMARY

An embodiment that is described herein provides a method in a communication device. The method includes exchanging data between a Baseband Integrated Circuit (BBIC) and a Radio Frequency Integrated Circuit (RFIC) over a digital interface having a variable clock rate. The clock rate of the digital interface is modified during a communication session conducted by the communication device.

In some embodiments, modifying the clock rate includes determining an operational state of the communication device and changing the clock rate based on the determined operational state. In an embodiment, modifying the clock rate includes alternating among two or more predefined clock rates during the communication session. In a disclosed embodiment, exchanging the data includes generating a clock signal for the digital interface using a Digital Phase-Locked Loop (DPLL) when operating in a given subset of the predefined clock rates, and deactivating the DPLL when not operating in the given subset of the clock rates.

In some embodiments, modifying the clock rate includes executing a state machine that defines multiple operational states and respective clock rates to be applied at the states, and setting the clock rate in accordance with a state determined by the state machine. In an embodiment, executing the state machine includes alternating between a normal-power idle state in which the digital interface operates at a first clock rate, and a low-power idle state in which the digital interface operates at a second clock rate that is lower than the first clock rate.

In a disclosed embodiment, modifying the clock rate includes setting the clock rate for a transmit path and for a receive path of the digital interface independently of one another. In another embodiment, modifying the clock rate includes setting a High Speed (HS) clock rate during transmission periods of the communication device, and setting a clock rate other than the HS clock rate outside the transmission periods. In yet another embodiment, the communication device receives signals only during discontinuous wake-up periods, and modifying the clock rate includes setting a first clock rate during the wake-up periods and a second clock rate outside the wake-up periods. In an embodiment, exchanging the data includes communicating over the digital interface in accordance with a DigRF specification.

There is additionally provided, in accordance with an embodiment of the present invention, apparatus including a Baseband Integrated Circuit (BBIC) and a Radio Frequency Integrated Circuit (RFIC) that are configured to exchange data with one another over a digital interface having a variable clock rate. At least one of the BBIC and the RFIC includes control circuitry that is configured to modify a clock rate of the digital interface during a communication session conducted by the apparatus. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

In communication devices that comprise a Baseband Integrated Circuit (BBIC) and a Radio Frequency Integrated Circuit (RFIC) connected by a digital interface, the digital interface is a major consumer of electrical power. The power consumption of the digital interface typically grows with the clock rate at which it operates.

Embodiments that are described herein reduce the power consumption of such a communication device by adaptively modifying the clock rate of the digital interface. Although the embodiments described herein refer mainly to DigRF-3G interfaces, the disclosed techniques are applicable to other DigRF variants as well as to other suitable interfaces. The embodiments described herein refer mainly to mobile communication terminals that operate in cellular networks, e.g., Global System for Mobile Communications (GSM), Wideband Code Division Multiple Access (WCDMA) or Long-Term Evolution (LTE) networks. The disclosed techniques, however, are not limited to such applications and can be used in any other equipment in which power saving is of importance.

In some disclosed embodiments, the BBIC comprises control circuitry that modifies the clock rate of the digital interface during communication sessions conducted by the device. The control circuitry typically operates the digital interface, for communicating between the BBIC and the RFIC, at any given time at the lowest possible clock rate selected from a set of predefined clock rates.

In one embodiment, a subset of the predefined clock rates (e.g., the highest clock rate) is generated using a Digital Phase-Locked Loop (DPLL). In this embodiment, the control circuitry deactivates the DPLL when not using the clock rates in the subset. Selectively deactivating the DPLL reduces power consumption considerably.

In some embodiments, the control circuitry executes a state machine that determines the current operational state of the device. Various states of the state machine (e.g., various idle, transmission and reception states) define the respective clock rates for transmission and reception over the digital interface while operating in these states. When transitioning from one operational state to another, the control circuitry modifies the digital interface clock rates as needed, according to the new state.

The techniques described herein achieve considerable reduction in the power consumption of the digital interface. When the disclosed techniques are applied in a battery-powered mobile communication terminal, for example, standby time and talk time can be increased and smaller, lower-cost batteries can be used.

Figure 1:
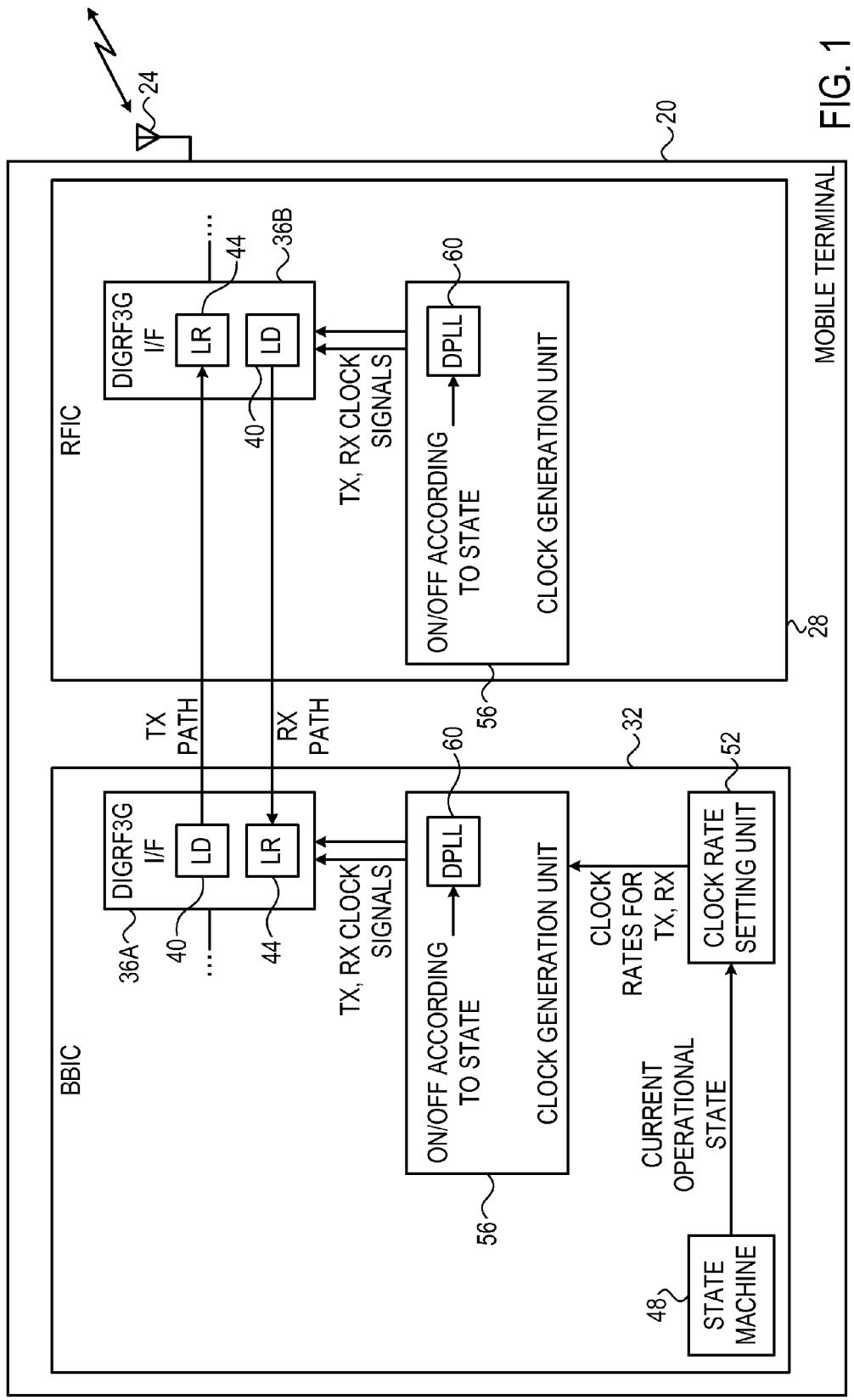
FIG. 1 is a block diagram that schematically illustrates a mobile communication terminal, in accordance with an embodiment that is described herein.

FIG. 1 is a block diagram that schematically illustrates a mobile communication terminal 20, in accordance with an embodiment that is described herein. In the present example, terminal 20 comprises a dual-mode terminal that is configurable to operate in Global System for Mobile Communications (GSM) and Wideband Code Division Multiple Access (WCDMA) networks. GSM operation is also referred to herein as second generation (2 G) operation, and WCDMA operation is also referred to herein as third generation (3 G) operation.

In alternative embodiments, terminal 20 may operate in accordance with any other suitable communication protocol, such as Long-Term Evolution (LTE). Terminal 20 may comprise, for example, a cellular phone, a wireless-enabled mobile computing device and/or any other suitable kind of communication terminal. Although the embodiments described herein refer mainly to communication terminals, the disclosed techniques are also applicable to digital interfaces that connect BBIC and RFIC in other kinds of communication devices, such as base stations for mobile telecommunications or any other suitable communication equipment in which reduction of power consumption is of importance.

In the embodiment of FIG. 1, terminal 20 comprises a BBIC 32, which communicates with a RFIC 28 over a DigRF-3G digital interface. In some embodiments, the BBIC and RFIC are fabricated in separate devices. In other embodiments, the BBIC and RFIC are packaged in a single device. RFIC 28 typically communicates with a base station (not shown) using RF signals via an antenna 24. On transmission, BBIC 32 produces messages for transmission and transfers them over the DigRF interface to RFIC 28. On reception, RFIC 28 receives messages originating from the base station, and transfers them for decoding to BBIC 32 via the DigRF interface.

BBIC 32 comprises a DigRF-3G module 36A, and RFIC 28 comprises a DigRF-3G module 36B. DigRF-3G modules 36A and 36B communicate with one another over a transmit path (from the BBIC to the RFIC) and over a receive path (from the RFIC to the BBIC). In the embodiment seen, each DigRF-3G module comprises a Line Driver (LD) 40 for transmitting to the peer DigRF-3G module, and a Line Receiver (LR) 44 for receiving from the peer DigRF-3G module. The DigRF-3G modules typically exchange control commands and In-phase/Quadrature (I/Q) data between the BBIC and RFIC. The illustration in FIG. 1 is highly simplified, to avoid obfuscating teaching the principles of the disclosed techniques. A mobile communication terminal typically comprises additional elements that are not shown in the figure.

In some embodiments, DigRF-3G modules 36A and 36B are configurable to communicate at various predefined clock rates, depending on a current mode of operation of terminal 20. The clock rate typically is set independently in each direction of the DigRF-3G interface. In an example embodiment, the transmit path is configurable to operate at a clock rate of 6.5 MHz (referred to as Low Speed—LS), 26 MHz (referred to as Medium Speed—MS) or 312 MHz (referred to as High Speed—HS). The receive path is configurable to operate at a clock rate of 6.5 MHz (LS) or 312 MHz (HS). In alternative embodiments, any other suitable sets of predefined clock rates can be used in the respective transmit and receive paths of the DigRF-3G interface.

Terminal 20 comprises control circuitry that sets the appropriate clock rates for the transmit and receive paths of the interface, in an embodiment. In the example embodiment of FIG. 1, the control circuitry comprises a state machine 48, a clock rate setting unit 52 and clock generation units 56 in the BBIC and in the RFIC. The control circuitry typically modifies the clock rate of the transmit and/or receive paths of the DigRF-3G interface, such that DigRF-3G modules 36A and 36B operate at the lowest possible clock rate at any given time. As a result, the power consumption of the BBIC and RFIC is reduced. In alternative embodiments, the disclosed functionality can be implemented using other suitable logic.

The control circuitry modifies the clock rate during normal operation of terminal 20, e.g., during communication sessions that are conducted between the terminal and the base station. This kind of on-going clock rate modification is in contrast to one-time setting of the interface clock rate during initialization. In an embodiment, the control circuitry initializes the clock rates during initialization, and later modifies them adaptively during normal operation of the terminal.

Figure 2:
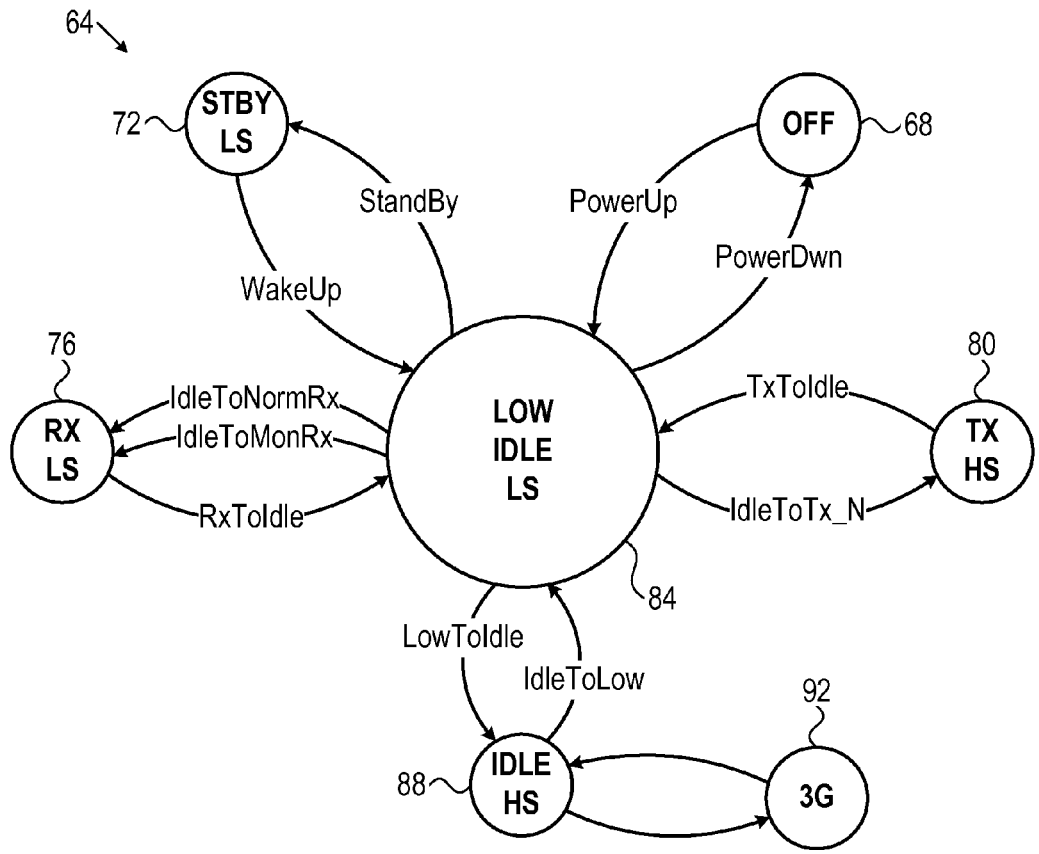
FIG. 2 is a state-machine diagram defining operational states of a mobile communication terminal, in accordance with an embodiment that is described herein.

In the embodiment of FIG. 1, BBIC 32 executes state machine 48. The state machine comprises logic that defines multiple operational states of the terminal, and transition conditions that define transitions from one state to another. Operational states may comprise, for example, off, standby, receive, transmit and idle. An example state machine is shown in FIG. 2 below. Thus, as the BBIC transitions from one operational state to another, state machine 48 outputs the current operational state.

Clock rate setting unit 52 accepts the current operational state of the terminal as input. Based on the current operational state, unit 52 indicates the clock rates to be used on the transmit and receive paths of the DigRF-3G interface. Typically, unit 52 holds a table of the DigRF-3G transmit and receive clock rates to be used in each operational state.

Clock generation unit 56 in BBIC 32 accepts the clock rate indications from unit 52, and generates the clock signals for DigRF-3G unit 36A accordingly. In the present embodiment, unit 56 produces a 6.5 MHz (LS), 26 MHz (MS) or 312 MHz (HS) clock signal for the transmit path, and a 6.5 MHz (LS) or 312 MHz (HS) clock signal for the receive path, depending on the clock rate indications accepted from unit 52.

Thus, in an embodiment, the control circuitry modifies the clock rates of DigRG-3G module 36A depending on the current operational state of terminal 20. In the present example, DigRG-3G module 36A operates as a master and DigRG-3G module 36B operates as a slave. Therefore, the clock rates of module 36A in the BBIC dictate the clock rates of module 36B in the RFIC, as well. In an example embodiment, clock generation unit 56 in RFIC 28 is notified by the corresponding unit 56 in BBIC 32 of the clock rates to be applied to the transmit and receive path, e.g., using suitable registers in DigRG-3G module 36B. By operating the DigRF-3G interface in the BBIC and RFIC at the lowest possible clock rates suitable for a particular operational state, the disclosed technique achieves considerable reduction in power consumption.

In some embodiments, unit 56 in each of the BBIC and the RFIC generates a certain subset of the predefined clock rates using a respective Digital Phase-Locked Loop (DPLL) 60. The other clock rates are generated using other means. In the present example, DPLL 60 generates the HS clock rate (312 MHz). In this embodiment, unit 56 activates the DPLL only when operating the DigRF-3G interface at the 312 MHz clock rate. When the 312 MHz is not used, unit 56 deactivates the DPLL in order to conserve power. In one embodiment, only the DPLL in RFIC 28 is deactivated while the DPLL in BBIC 32 remains continuously active. In another embodiment, only the DPLL is BBIC 32 is deactivated. In yet another embodiment, the DPLLs in both RFIC 28 and BBIC 32 are deactivated.

In some embodiments, terminal 20 supports a 2G (GSM) Discontinuous Reception (DRX) mode. When operating in this mode, the terminal wakes up at certain wake-up periods and attempts to receive the base station signals during these periods. Outside the wake-up periods, the terminal is in standby and does not receive or transmit signals in order to conserve battery power. In some embodiments, the control circuitry sets the DigRF-3G clock rate to MS, and deactivates DPLL 60. This setting reduces power consumption, and is possible because no transmission bursts need to be transmitted or received.

In some embodiments, the control circuitry sets the DigRF-3G clock rate to HS (and activates the DPLL), for example, only during active transmission bursts. Outside the transmission bursts, the DigRF-3G clock rate is set to MS or LS. As a result, the DPLL is active only during the transmission bursts, and power consumption is reduced considerably.

The terminal configuration shown in FIG. 1 is an example configuration, which is depicted solely for the sake of clarity. In alternative embodiments, any other suitable terminal configuration can be used. Terminal elements that are not mandatory for understanding of the disclosed techniques have been omitted from the figure for the sake of clarity. In some embodiments, BBIC 32 and RFIC 28 are implemented as a signal processing chipset for mobile communication terminals.

In various embodiments, some or all of the elements of terminal 20 are implemented in hardware, such as implementing the BBIC using one or more Field-Programmable Gate Arrays (FPGAs) or Application-Specific Integrated Circuits (ASICs). In alternative embodiments, certain elements of terminal 20, e.g., certain functions of the BBIC, are implemented in software, or using a combination of hardware and software elements. In some embodiments, certain elements of terminal 20, such as certain elements of BBIC 32, are implemented in a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

FIG. 2 is a schematic diagram of a state-machine diagram defining operational states of a mobile communication terminal, in accordance with an embodiment that is described herein. The figure shows a state machine 64 that comprises an example configuration of seven operational states, namely an OFF state 68, a standby (STBY) state 72, a reception (RX) state 76, a transmission (TX) state 80, a low-power idle (LOW IDLE) state 84, an IDLE state 88 and a 3G state 92. Arrows between the states illustrate possible transitions between the states. This state machine can be used for implementing state machine 48 of FIG. 1 above.

The example state machine of FIG. 2 focuses on the operational states that specify 2 G (GSM) operation of terminal 20, for the sake of clarity. Six of the seven states (all but state 92) refer to 2 G operation, whereas 3 G (WCDMA) operation is represented in the example by a single state (state 92).

As can be seen in the figure, each operational state in state machine 64 specifies a respective clock rate to be used on the DigRF-3G interface when operating in that state:

TABLE 1

DigRF-3G clock rates per operational state

| | | DigRF-3G clock rate | |
|---|---|---|---|
| | Operational state | RX path | TX path |
| 2G | STBY | MS | LS |
| | IDLE | MS | HS |
| | LOW IDLE | MS | LS |
| | RX | MS | LS |
| | TX | MS | HS |
| 3G | RX/TX | HS | HS |

In an embodiment, as noted above, the clock rates for the various operational states are defined in clock rate setting unit 52. In alternative embodiments, the clock rates are embedded in the logic of the state machine. When transitioning between operational states, clock rate setting unit 52 indicates the applicable DigRF-3G clock rate to clock generation unit 56 of BBIC 32, which generates the appropriate clock signal for DigRF-3G module 36A.

Note that state machine 64 comprises two separate IDLE states—a normal idle state (state 88) in which the DigRF-3G interface operates at HS, and a low-idle state (state 84) in which the DigRF-3G interface operates at LS. In one embodiment, DPLL 60 is activated when the terminal is in IDLE state 88, and deactivated when the terminal is in LOW IDLE state 84.

The state machine shown in FIG. 2 is an example state machine, which is depicted solely for the sake of clarity. In alternative embodiments, any other suitable state machine (e.g., any other suitable set of states and/or any other suitable mapping of DigRF-3G clock rates to states) can be used. In an embodiment, the state machine is implemented using suitable hardware logic.

Figure 3:
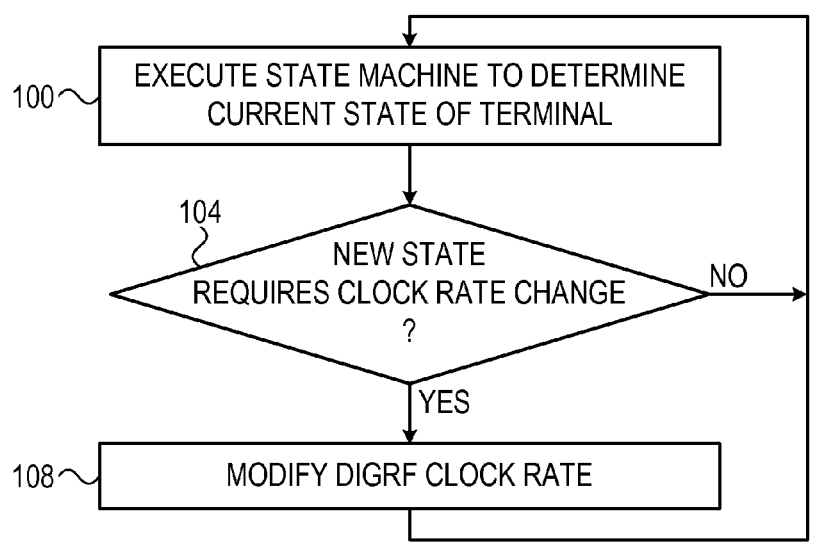
FIG. 3 is a flow chart that schematically illustrates a method for setting clock rates in a DigRF interface of a mobile communication terminal, in accordance with an embodiment that is described herein.

FIG. 3 is a flow chart that schematically illustrates a method for setting the clock rates in the DigRF-3G interface of mobile communication terminal 20, in accordance with an embodiment that is described herein. The method begins with the control circuitry of BBIC 32 executing state machine 48, at a state execution operation 100. When transitioning to a new operational state, the control circuitry checks whether the new state has a different DigRF-3G clock rate relative to the previous state, at a clock change checking operation 104.

If the transition to the new state does not require a change in clock rate, the method loops back to operation 100 above in which the control circuitry continues to execute the state machine. If, on the other hand, the transition to the new state requires a change in clock rate, the control circuitry modifies the DigRF-3G clock rate to the clock rate defined for the new state, at a clock rate modification operation 108. The method then loops back to operation 100 above.

Figure 4:
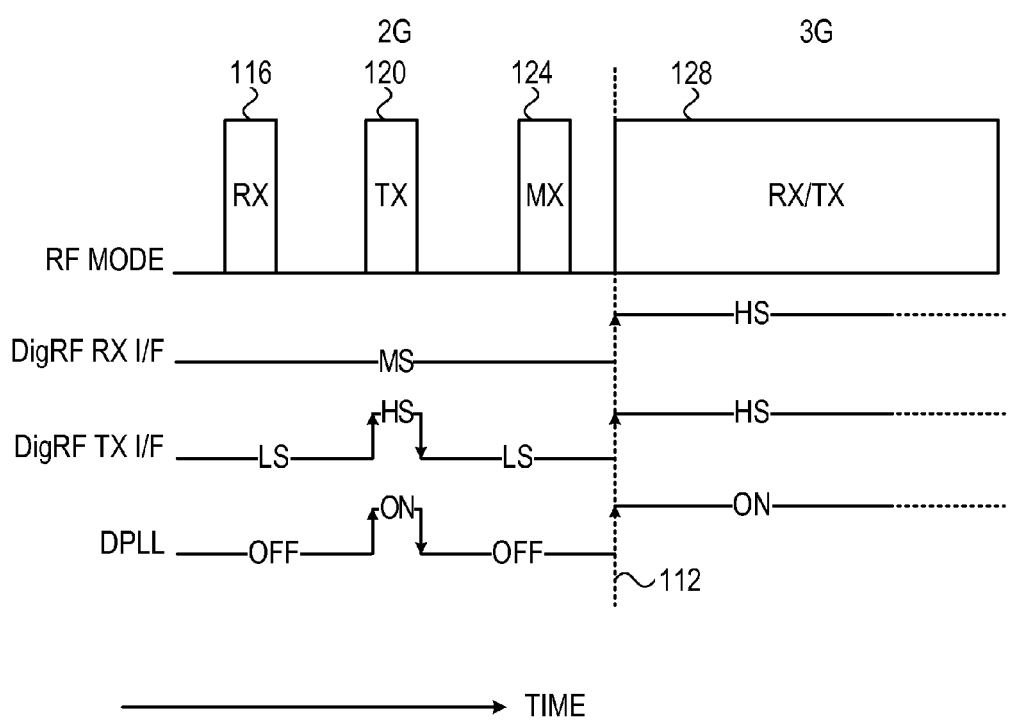
FIG. 4 is a diagram that schematically illustrates a sequence of changes in DigRF clock rates in a mobile communication terminal, in accordance with an embodiment that is described herein.

FIG. 4 is a diagram that schematically illustrates a sequence of changes in DigRF clock rates in terminal 20 over time, in accordance with an embodiment that is described herein. In the present example, the terminal initially communicates in 2G (GSM), and switches to 3G (WCDMA) operation at a time 112. During 2 G operation, the terminal receives GSM signals at a reception (RX) interval 116, transmits GSM signals at a transmission (TX) interval 120, and performs measurements on neighbor cell signals at a measurement (MX) interval 124. At a 3G interval 128 following time 112, the terminal transmits and receives WCDMA signals concurrently.

During 2 G operation, the control circuitry modifies the DigRF-3G clock rates as follows: During RX interval 116, the DigRF-3G receive path is set to operate at MS, the DigRF-3G transmit path is set to operate at LS, and DPLL 60 is deactivated. During TX interval 120, the DigRF-3G receive path remains at MS, the DigRF-3G transmit path is modified to operate at HS, and DPLL 60 is therefore activated. During MX interval 124, the DigRF-3G receive path is still at MS, the DigRF-3G transmit path is modified back to operate at LS, and DPLL 60 is deactivated. During 3 G operation in 3G interval 128, the DigRF-3G transmit and receive paths are set to HS, and DPLL 60 is therefore activated.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a communication device, exchanging data between a Baseband Integrated Circuit (BBIC) and a Radio Frequency Integrated Circuit (RFIC) over a digital interface having a variable clock rate; and
during a communication session conducted by the communication device, repeatedly modifying the clock rate of the digital interface, in response to changes in a current operational state of the communication device during the communication session, to a lowest clock rate that is suitable for the current operational state, so as to reduce a power consumption of the communication device.

2. The method according to claim 1, wherein modifying the clock rate comprises alternating among two or more predefined clock rates during the communication session.

3. The method according to claim 2, wherein exchanging the data comprises generating a clock signal for the digital interface using a Digital Phase-Locked Loop (DPLL) when operating in a given subset of the predefined clock rates, and deactivating the DPLL when not operating in the given subset of the clock rates.

4. The method according to claim 1, wherein modifying the clock rate comprises executing a state machine that defines multiple operational states and respective clock rates to be applied at the states, and setting the clock rate in accordance with the current operational state determined by the state machine.

5. The method according to claim 4, wherein executing the state machine comprises alternating between a normal-power idle state in which the digital interface operates at a first clock rate, and a low-power idle state in which the digital interface operates at a second clock rate that is lower than the first clock rate.

6. The method according to claim 1, wherein modifying the clock rate comprises setting the clock rate for a transmit path and for a receive path of the digital interface independently of one another.

7. The method according to claim 1, wherein modifying the clock rate comprises setting a High Speed (HS) clock rate during transmission periods of the communication device, and setting a clock rate other than the HS clock rate outside the transmission periods.

8. The method according to claim 1, wherein the communication device receives signals only during discontinuous wake-up periods, and wherein modifying the clock rate comprises setting a first clock rate during the wake-up periods and a second clock rate outside the wake-up periods.

9. The method according to claim 1, wherein exchanging the data comprises communicating over the digital interface in accordance with a DigRF specification.

10. Apparatus, comprising:
a Baseband Integrated Circuit (BBIC) and a Radio Frequency Integrated Circuit (RFIC) that are configured to exchange data with one another over a digital interface having a variable clock rate,
wherein at least one of the BBIC and the RFIC comprises control circuitry that is configured to repeatedly modify a clock rate of the digital interface, in response to changes in a current operational state of the communication device during a communication session conducted by the apparatus, to a lowest clock rate that is suitable for the current operational state, so as to reduce a power consumption of the apparatus.

11. The apparatus according to claim 10, wherein the control circuitry is configured to alternate among two or more predefined clock rates during the communication session.

12. The apparatus according to claim 11, wherein the control circuitry is configured to generate a clock signal for the digital interface using a Digital Phase-Locked Loop (DPLL) when operating in a given subset of the predefined clock rates, and to deactivate the DPLL when not operating in the given subset of the clock rates.

13. The apparatus according to claim 10, wherein the control circuitry is configured to execute a state machine that defines multiple operational states and respective clock rates to be applied at the states, and to set the clock rate in accordance with the current operational state determined by the state machine.

14. The apparatus according to claim 13, wherein the control circuitry is configured to alternate between a normal-power idle state in which the digital interface operates at a first clock rate, and a low-power idle state in which the digital interface operates at a second clock rate that is lower than the first clock rate.

15. The apparatus according to claim 10, wherein the control circuitry is configured to set the clock rate for a transmit path and for a receive path of the digital interface independently of one another.

16. The apparatus according to claim 10, wherein the control circuitry is configured to set a High Speed (HS) clock rate during transmission periods of the communication device, and to set a clock rate other than the HS clock rate outside the transmission periods.

17. The apparatus according to claim 10, wherein the apparatus receives signals only during discontinuous wake-up periods, and wherein the control circuitry is configured to set a first clock rate during the wake-up periods and a second clock rate outside the wake-up periods.

18. The apparatus according to claim 10, wherein the BBIC and the RFIC are configured to communicate over the digital interface in accordance with a DigRF specification.

19. A mobile communication terminal comprising the apparatus of claim 10.

20. A chipset for processing signals in a mobile communication terminal, comprising the apparatus of claim 10.

* * * * *